(12) United States Patent
Berggren et al.

(10) Patent No.: US 10,530,541 B2
(45) Date of Patent: Jan. 7, 2020

(54) TRANSMITTING DEVICE, RECEIVING DEVICE AND METHODS THEREOF

(71) Applicant: Huawei Technologies Co., Ltd., Shenzhen (CN)

(72) Inventors: Fredrik Berggren, Kista (SE); Fan Wang, Shenzhen (CN); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/146,199

(22) Filed: Sep. 28, 2018

(65) Prior Publication Data

US 2019/0036656 A1 Jan. 31, 2019

Related U.S. Application Data

(63) Continuation of application No. PCT/EP2016/057133, filed on Mar. 31, 2016.

(51) Int. Cl.
*H04L 5/00* (2006.01)
*H04L 27/26* (2006.01)

(52) U.S. Cl.
CPC ............ *H04L 5/001* (2013.01); *H04L 5/0041* (2013.01); *H04L 5/0053* (2013.01); *H04L 27/2614* (2013.01); *H04L 27/2636* (2013.01)

(58) Field of Classification Search
CPC ..... H04L 5/001; H04L 5/0041; H04L 5/0053; H04L 27/2636; H04L 27/2614
See application file for complete search history.

(56) References Cited

U.S. PATENT DOCUMENTS

| | | | |
|---|---|---|---|
| 9,065,714 B2 * | 6/2015 | Malladi | H04J 13/0074 |
| 2008/0090528 A1 * | 4/2008 | Malladi | H04L 1/0004 |
| | | | 455/70 |

(Continued)

FOREIGN PATENT DOCUMENTS

EP 2512083 A2 10/2012

OTHER PUBLICATIONS

Dahlman, et al., "Uplink Physical-Layer Processing (Chapter 11)", In: "4G LTE/LTE—Advanced for Mobile Broadband", Elsevier, pp. 203-246 (Mar. 21, 2011).

(Continued)

*Primary Examiner* — Jean B Corrielus
(74) *Attorney, Agent, or Firm* — Leydig, Voit & Mayer, Ltd.

(57) ABSTRACT

A transmitting device and a receiving device are provided. The transmitting device comprises a signal processor configured to modulate bits representing control information for providing at least a first set of modulation symbols and a second set of modulation symbols, provide a first set of mapped modulation symbols by mapping the first set of modulation symbols onto a set of frequency resources within a first sub-band, and provide a second set of mapped modulation symbols by mapping the second set of modulation symbols onto a corresponding set of frequency resources within a second sub-band, wherein the first set of mapped modulation symbols and the second set of mapped modulation symbols differ from each other in at least one modulation symbol, and wherein the first sub-band and the second sub-band are non-overlapping.

18 Claims, 7 Drawing Sheets

(56) References Cited

U.S. PATENT DOCUMENTS

| | | | |
|---|---|---|---|
| 2010/0195566 A1* | 8/2010 | Krishnamurthy | H04L 5/0007 370/328 |
| 2012/0320880 A1* | 12/2012 | Han | H04L 5/001 370/335 |
| 2014/0334563 A1* | 11/2014 | Chen | H04L 1/0031 375/260 |
| 2016/0192385 A1* | 6/2016 | Tooher | H04L 5/0051 370/336 |
| 2017/0150523 A1* | 5/2017 | Patel | H04B 7/26 |
| 2019/0098622 A1* | 3/2019 | Lee | H04W 72/042 |

OTHER PUBLICATIONS

Huawei et al., "New PUCCH format design to support UCI transmission for up to 32 component carriers", 3GPP TSG RAN WG1 Meeting #80bis, Belgrade, Serbia, 4 pages (Apr. 20-24, 2015).
3GPP TS 36.211 V13.1.0 (Mar. 2016), 3rd Generation Partnership Project;Technical Specification Group Radio Access Network; Evolved Universal Terrestrial Radio Access (E-UTRA); Physical channels and modulation (Release 13), 155 pages (Mar. 29, 2016).

* cited by examiner

TRANSMITTING DEVICE, RECEIVING DEVICE AND METHODS THEREOF

CROSS-REFERENCE TO RELATED APPLICATIONS

This application is a continuation of International Application No. PCT/EP2016/057133, filed on Mar. 31, 2016, the disclosure of which is hereby incorporated by reference in its entirety.

TECHNICAL FIELD

Embodiments of the disclosure relate to a transmitting device and a receiving device for a wireless communication system. Furthermore, the disclosure also relates to corresponding methods, a wireless communication system, a computer program, and a computer program product.

BACKGROUND

For cellular communications, especially in the uplink (UL), it is important to maintain a low Peak-to-Average-Power Ratio/Cubic Metric (PAPR/CM) of the transmitted signal for less power backoff in the amplifier. This in turn offers better coverage and less power consumption of the user device. Multi-carrier signals, such as Orthogonal Frequency Division Multiplexing (OFDM), are known to exhibit rather large PAPR/CM. One method used in Long Term Evolution (LTE) uplink for reducing the PAPR/CM is to apply a Discrete Fourier Transform (DFT) precoder, which applied prior to the Inverse Fast Fourier Transform (IFFT) operation, produces a Single Carrier—Frequency Division Multiple Access (SC-FDMA) signal.

In LTE uplink, the control channel, Physical Uplink Control Channel (PUCCH), is conveying Uplink Control information (UCI), e.g., Hybrid Automatic Repeat reQuest-ACKnowledgement (HARQ-ACK), Channel State Information (CSI) and Scheduling Request (SR), by using different PUCCH formats. The PUCCH formats are distinguished by their payload capacities as well as other properties, e.g., some are based on modulated sequences while some are DFT precoded and some are capable of Code Division Multiplexing (CDM) among User Equipments (UEs). PUCCH formats 1/1a/1b/2/2a/2b/3/5 are transmitted in one Physical Resource Block (PRB) pair (i.e., one PRB in the first slot and one PRB in the second slot of a subframe), and PUCCH format 4 is transmitted with one, or more than one, PRB pair(s) per slot. For PUCCH format 4, the transmission is made in one cluster of one or multiple PRBs contiguously located in the frequency domain within a slot. This assures low PAPR/CM. Furthermore, for all PUCCH formats, frequency hopping is used between the two slots in a subframe for the PRB pairs, such that the PRBs are located towards different edges of the carrier in the two slots.

LTE can also be deployed for transmissions in unlicensed spectrum with carrier aggregation, i.e., utilizing Licensed Assisted Access (LAA) where an unlicensed carrier is operated as a Secondary cell (SCell) in conjunction with a Primary cell (PCell) located in licensed spectrum. For LAA, a first regulatory requirement is that the occupied channel bandwidth shall be between 80% and 100% of the declared nominal channel bandwidth. The occupied channel bandwidth is the bandwidth containing 99% of the power of the signal. This requirement does not mandate that only a single UE can occupy 80-100% of the carrier bandwidth. For example, it would be possible to multiplex PUCCHs from several UEs in an UL subframe over the whole carrier bandwidth using some form of interleaved Frequency Division Multiplex (FDM) allocation, while fulfilling the occupied channel bandwidth requirement. In addition, a second regulatory requirement is the maximum transmission power in a narrow band. For example, in the frequency band 5250-5350 MHz, transmissions shall be limited to a maximum mean Equivalent Isotropically Radiated Power (EIRP) density of 10 mW/MHz in any 1 MHz band. This implies that, in order not to limit the transmit power, it is beneficial to allocate the resources in as many '1 MHz' bands as possible.

A PUCCH being transmitted in frequency localized manner may not fulfill the bandwidth occupancy requirement, since it may not span a sufficient bandwidth in any given slot. In order to efficiently meet the bandwidth requirement, extending the current single cluster allocation to allow multi-cluster (>2) allocation (e.g., PRBs spaced uniformly in frequency) has been identified as a candidate waveform for PUCCH. The LTE PUCCH formats, e.g., PUCCH formats 1/1a/1b/2/2a/2b/3/5, occupy only one PRB pair in the frequency domain, which does not fit into the multi-cluster PUCCH resource with multiple PRB pairs. It would still be desirable if the multi-cluster PUCCH could be based on existing LTE PUCCH formats, e.g., PUCCH formats 3/4/5, which can carry sufficiently large payloads while benefitting from low PAPR/CM due to DFT preceding. This would be advantageous since much of the receiver and transmitter processing of the PUCCH could be reused. Furthermore, the multi-cluster PUCCH should preferably be designed for low PAPR/CM to avoid power backoff which could imply coverage limitation.

SUMMARY

An objective of embodiments of the disclosure is to provide a solution which mitigates or solves the drawbacks and problems of conventional solutions.

The above and further objectives are achieved by the subject matter of the independent claims.

Further advantageous implementation forms of the disclosure are defined by the dependent claims.

According to a first aspect of the disclosure, the above mentioned and other objectives are achieved with a transmitting device for a wireless communication system, the transmitting device comprising
a signal processor configured to
  modulate bits representing (uplink) control information for providing at least a first set of modulation symbols and a second set of modulation symbols,
  provide a first set of mapped modulation symbols by mapping the first set of modulation symbols onto a set of frequency resources within a first sub-band, and
  provide a second set of mapped modulation symbols by mapping the second set of modulation symbols onto a corresponding set of frequency resources within a second sub-band,
  wherein the first set of mapped modulation symbols and the second set of mapped modulation symbols differ from each other in at least one modulation symbol, and
  wherein the first sub-band and the second sub-band are non-overlapping.

The expression "the first set and the second set differ from each other in at least one modulation symbol" should be understood that it includes that at least one modulation symbol/bit is different among the two sets. Further, it should be noted that at least a first set of modulation symbols and a second set of modulation symbols are provided. This implies that at least two sets of modulation symbols are provided meaning that the cases of three sets, four sets, five sets, and so forth, are also covered by embodiments of the disclosure.

Mapping may mean allocating or assigning modulation symbols to time-frequency resources, e.g., REs, subcarriers, etc.

A sub-band is a part of the whole transmission bandwidth. Therefore, the transmission bandwidth of the system is divided into a plurality of sub-bands. A sub-band could comprise a number of PRBs or REs and sub-bands may be of same or different size.

A transmitting device according to the first aspect provides a number of advantages over conventional transmitting devices. In particular it can provide an uplink control channel which can be transmitted on a non-contiguous multi-cluster resource structure with a large number of PRBs, while reusing the main features of existing PUCCH formats and providing low CM/PAPR performance. Thereby, it can provide a certain percentage of channel bandwidth occupancy, good PAPR/CM performance and low complexity by leveraging existing uplink control channel structures.

In a first possible implementation form of a transmitting device according to the first aspect, the signal processor is configured to scramble the bits representing the control information using a first sub-band specific scrambling sequence for the first sub-band and a second sub-band specific scrambling sequence for the second sub-band so as to provide a first scrambled sequence and a second scrambled sequence, modulate the first scrambled sequence and the second scrambled sequence so as to provide the first set of modulation symbols and the second set of modulation symbols.

Scrambling may mean a bit-wise addition modulo 2 of the bits representing the control information and the scrambling sequence.

An advantage of scrambling using sub-band specific scrambling sequences is the low-complexity as it does not require any multiplications due to the modulo addition operation. It also requires minimum change to existing PUCCH formats as only the input bit sequence is modified and therefore reduces the cost and implementation complexity of the transmitter and receiver.

In a second possible implementation form of a transmitting device according to the first implementation form of the first aspect, the signal processor is configured to generate the first sub-band specific scrambling sequence using a pseudo-random sequence with a first sub-band specific initialization value for the first sub-band and generate the second sub-band specific scrambling sequence using a pseudo-random sequence with a second sub-band specific initialization value for the second sub-band.

This is advantageous as it provides good randomization while being able to provide different scrambling sequences being generated from one pseudo-random sequence by just using different initial states in the scrambling sequence generator.

In a third possible implementation form of a transmitting device according to the first aspect, the signal processor is configured to cyclically shift the positions of the modulation symbols in the first set of modulation symbols so as to provide the second set of modulation symbols, or cyclically shift the positions of the modulation symbols in the second set of modulation symbols so as to provide the first set of modulation symbols.

An advantage of cyclic shifting is the low complexity as it does not require any multiplications of the modulation symbols. It also requires minimum change to existing PUCCH formats and therefore reduces the cost and implementation complexity of the transmitter and receiver.

In a fourth possible implementation form of a transmitting device according to the first aspect, the signal processor is configured to interleave the first set of modulation symbols using a first sub-band specific interleaver for the first sub-band and interleave the second set of modulation symbols using a second sub-band specific interleaver for the second sub-band (so as to provide the first set of modulation symbols and the second set of modulation symbols).

An advantage of interleaving is the low complexity as it does not require any multiplications of the modulation symbols. It also requires minimum change to existing PUCCH formats and therefore reduces the cost and implementation complexity of the transmitter and receiver.

In a fifth possible implementation form of a transmitting device according to any of the preceding implementation forms of the first aspect or to the first aspect as such, the signal processor is configured to provide a first set of precoded modulation symbols and a second set of precoded modulation symbols by Discrete Fourier Transform, DFT, the first set of modulation symbols and the second set of modulation symbols, provide the first set of mapped modulation symbols by mapping the first set of precoded modulation symbols onto the set of frequency resources within the first sub-band, and provide the second set of mapped modulation symbols by mapping the second set of precoded modulation symbols onto a corresponding set of frequency resources within a second sub-band.

An advantage of DFT precoding is that the PAPR/CM can be reduced.

In a sixth possible implementation form of a transmitting device according to the fifth implementation form of the first aspect, the signal processor is configured to precode the first set of modulation symbols using a first sub-band specific DFT precoder for the first sub-band and precode the second set of modulation symbols using a second sub-band specific DFT precoder for the second sub-band.

An advantage of using sub-band specific DFT precoding is that it follows the structure of single-cluster PUCCH formats in LTE, which allows reusing much of the transmitter and receiver processing per sub-band.

In a seventh possible implementation form of a transmitting device according to the fifth implementation form of the first aspect, the first set of modulation symbols and the second set of modulation symbols are identical, and wherein the signal processor is configured to precode the first set of modulation symbols and the second set of modulation symbols using a single DFT precoder for the first sub-band and the second sub-band.

An advantage of using a single DFT precoder for all sub-bands is that the CM/PAPR can be made very low.

In an eight possible implementation form of a transmitting device according to any of the preceding implementation forms of the first aspect or to the first aspect as such, the signal processor is configured to generate a control signal based on the first set of mapped modulation symbols and the second set of mapped modulation symbols, wherein the transmitting device further comprises a transmitter configured to transmit the control signal using the set of frequency resources within a first sub-band and the corresponding set of frequency resources within the second sub-band.

A corresponding set could refer to that the resulting resource allocation is the same within the first sub-band and within the second sub-band. It should be noted that the sets may contain different resource indices, e.g., different PRB indices if the PRBs are enumerated over both sub-bands, but the resulting resource allocation becomes the same in both sub-bands.

In a ninth possible implementation form of a transmitting device according to any of the preceding implementation forms of the first aspect or to the first aspect as such, the set of frequency resources is a set of contiguous frequency resources and the corresponding set of frequency resources is a set of contiguous frequency resources. A set of contiguous frequency resources could refer to a set of contiguous PRBs or any other radio resource unit of the wireless communication system.

An advantage of having contiguous sets is that it can produce SC-FDMA signals with low PAPR/CM. Furthermore, it also allows accommodating varying payloads by properly selecting the number of frequency resources in the set.

In a tenth possible implementation form of a transmitting device according to any of the preceding implementation forms of the first aspect or to the first aspect as such, the first sub-band and the second sub-band comprise equal number of frequency resources.

In an eleventh possible implementation form of a transmitting device according to any of the preceding implementation forms of the first aspect or to the first aspect as such, the signal processor is configured to receive data from a network node, determine the control information based on the received data.

Embodiments of the disclosure also relates to a user device comprising a transmitting device according to the first aspect.

According to a second aspect of the disclosure, the above mentioned and other objectives are achieved with a receiving device for a wireless communication system, the receiving device comprising a receiver configured to receive a control signal associated with a transmitting device, the control signal comprising at least a first set of modulation symbols mapped onto a set of frequency resources within a first sub-band, and a second set of modulation symbols mapped onto a corresponding set of frequency resources within a second sub-band, wherein the first set of mapped modulation symbols and the second set of mapped modulation symbols differ from each other in at least one modulation symbol and are associated with control information;

a signal processor configured to derive the control information based on the control signal.

A receiving device according to the second aspect provides a number of advantages over conventional receiving devices. Low-complexity processing could be achieved by reusing receiver processing and algorithms according to existing uplink control channel formats defined for a single-cluster transmission. Furthermore, flexibility can be achieved in some cases by selecting to process only the signal generated from one of the sub-bands.

In a first possible implementation form of a receiving device according to the second aspect, the signal processor is configured to derive the control information based on at least the first set of mapped modulation symbols and the second set of mapped modulation symbols.

An advantage of this is that the receiver performance increases, since processing and combining more than one set of modulation symbols achieves higher frequency diversity and larger energy accumulation of the useful signal part.

Embodiments of the disclosure also relates to a network node comprising a receiving device according to the second aspect.

According to a third aspect of the disclosure, the above mentioned and other objectives are achieved with a method comprising modulating bits representing (uplink) control information for providing at least a first set of modulation symbols and a second set of modulation symbols, providing a first set of mapped modulation symbols by mapping the first set of modulation symbols onto a set of frequency resources within a first sub-band, and providing a second set of mapped modulation symbols by mapping the second set of modulation symbols onto a corresponding set of frequency resources within a second sub-band, wherein the first set of mapped modulation symbols and the second set of mapped modulation symbols differ from each other in at least one modulation symbol, and wherein the first sub-band and the second sub-band are non-overlapping.

In a first possible implementation form of a method according to the third aspect, the method comprises scrambling the bits representing the control information using a first sub-band specific scrambling sequence for the first sub-band and a second sub-band specific scrambling sequence for the second sub-band so as to provide a first scrambled sequence and a second scrambled sequence, modulating the first scrambled sequence and the second scrambled sequence so as to provide the first set of modulation symbols and the second set of modulation symbols.

Scrambling may mean a bit-wise addition modulo 2 of the bits representing the control information and the scrambling sequence.

In a second possible implementation form of a method according to the first implementation form of the third aspect, the method comprises generating the first sub-band specific scrambling sequence using a pseudo-random sequence with a first sub-band specific initialization value for the first sub-band and generate the second sub-band specific scrambling sequence using a pseudo-random sequence with a second sub-band specific initialization value for the second sub-band.

In a third possible implementation form of a method according to the third aspect, the method comprises cyclically shifting the positions of the modulation symbols in the first set of modulation symbols so as to provide the second set of modulation symbols, or cyclically shifting the positions of the modulation symbols in the second set of modulation symbols so as to provide the first set of modulation symbols.

In a fourth possible implementation form of a method according to the third aspect, the method comprises interleaving the first set of modulation symbols using a first sub-band specific interleaver for the first sub-band and interleaving the second set of modulation symbols using a second sub-band specific interleaver for the second sub-band (so as to provide the first set of modulation symbols and the second set of modulation symbols).

In a fifth possible implementation form of a method according to any of the preceding implementation forms of the third aspect or to the third aspect as such, the method comprises providing a first set of precoded modulation symbols and a second set of precoded modulation symbols by Discrete Fourier Transform, DFT, the first set of modulation symbols and the second set of modulation symbols, providing the first set of mapped modulation symbols by mapping the first set of precoded modulation symbols onto the set of frequency resources within the first sub-band, and providing the second set of mapped modulation symbols by mapping the second set of precoded modulation symbols onto a corresponding set of frequency resources within a second sub-band.

In a sixth possible implementation form of a method according to the fifth implementation form of the third aspect, the method comprises precoding the first set of modulation symbols using a first sub-band specific DFT precoder for the first sub-band and precoding the second set of modulation symbols using a second sub-band specific DFT precoder for the second sub-band.

In a seventh possible implementation form of a method according to the fifth implementation form of the third aspect, the first set of modulation symbols and the second set of modulation symbols are identical, and the method comprises precoding the first set of modulation symbols and the second set of modulation symbols using a single DFT precoder for the first sub-band and the second sub-band.

In an eight possible implementation form of a method according to any of the preceding implementation forms of the third aspect or to the third aspect as such, the method comprises generating a control signal based on the first set of mapped modulation symbols and the second set of mapped modulation symbols, transmitting the control signal using the set of frequency resources within a first sub-band and the corresponding set of frequency resources within the second sub-band.

A corresponding set could refer to that the resulting resource allocation is the same within the first sub-band and within the second sub-band. It should be noted that the sets may contain different resource indices, e.g., different PRB indices if the PRBs are enumerated over both sub-bands, but the resulting resource allocation becomes the same in both sub-bands.

In a ninth possible implementation form of a method according to any of the preceding implementation forms of the third aspect or to the third aspect as such, the set of frequency resources and the corresponding set of frequency resources are contiguous frequency resources. A set of contiguous frequency resources could refer to a set of contiguous PRBs or any other radio resource unit of the wireless communication system.

In a tenth possible implementation form of a method according to any of the preceding implementation forms of the first aspect or to the third aspect as such, the first sub-band and the second sub-band comprise equal number of frequency resources.

In an eleventh possible implementation form of a method according to any of the preceding implementation forms of the third aspect or to the third aspect as such, the method comprises receiving data from a network node, determining the control information based on the received data.

According to a fourth aspect of the disclosure, the above mentioned and other objectives are achieved with a method comprising receiving a control signal associated with a transmitting device, the control signal comprising at least a first set of modulation symbols mapped onto a set of frequency resources within a first sub-band, and a second set of modulation symbols mapped onto a corresponding set of frequency resources within a second sub-band, wherein the first set of mapped modulation symbols and the second set of mapped modulation symbols differ from each other in at least one modulation symbol and are associated with control information;

deriving the control information based on the control signal.

In a first possible implementation form of a method according to the fourth aspect, the method comprises deriving the control information based on at least the first set of mapped modulation symbols and the second set of mapped modulation symbols.

The advantages of the methods according to the third and fourth aspects are the same as for the corresponding transmitting device and receiving device according to the first and second aspects.

Embodiments of the disclosure also relates to a computer program, characterized in code means, which when run by processing means causes said processing means to execute any method according to the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Figure 1:
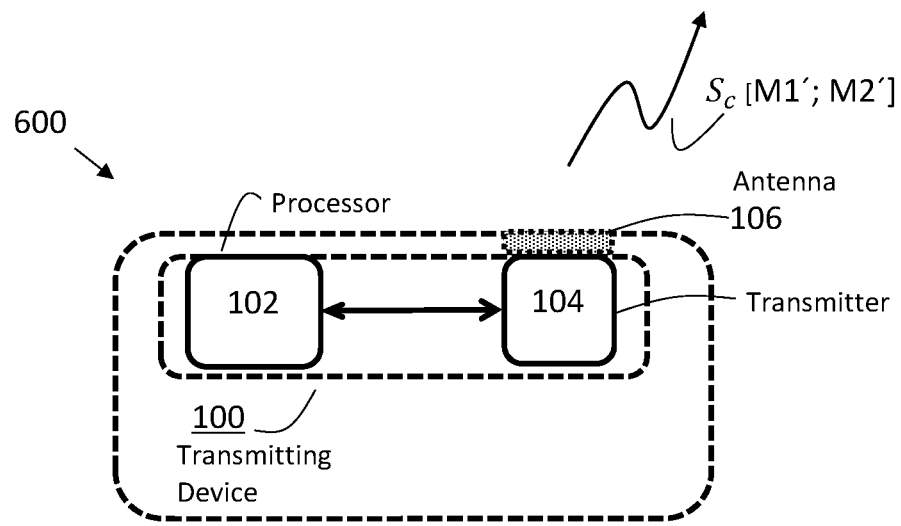
FIG. 1 shows a transmitting device according to an embodiment of the disclosure.

FIG. 1 shows a transmitting device 100 according to an embodiment of the disclosure. The transmitting device 100 comprises a signal processor 102 configured to modulate bits representing control information for providing at least a first set of modulation symbols M1 and a second set of modulation symbols M2. The signal processor 102 is configured to provide a first set of mapped modulation symbols M1' by mapping the first set of modulation symbols M1 onto a set of frequency resources R within a first sub-band. The signal processor 102 is configured to provide a second set of mapped modulation symbols M2' by mapping the second set of modulation symbols M2 onto a corresponding set of frequency resources R' within a second sub-band. According to embodiments of the disclosure the first set of mapped modulation symbols M1' and the second set of mapped modulation symbols M2' differ from each other in at least one modulation symbol, and further the first sub-band and the second sub-band are non-overlapping.

In an embodiment the transmitting device 100 is part of, or integrated in a user device 600 which is also shown in FIG. 1. Hence, the control information may in this particular case be UCI, and comprising HARQ-ACK, CSI, and SR, by using different PUCCH formats known in the art.

The user device 600 comprises a transmitter/transceiver 104 coupled to an antenna 106 configured to transmit in the wireless communication system 500. Therefore, the signal processor 102 is configured to generate a control signal $S_c$ based on the first set of mapped modulation symbols M1' and the second set of mapped modulation symbols M2'. The signal processor 102 is also configured to forward the control signal $S_c$ to the transmitter 104. The transmitter 104 is configured to transmit the control signal $S_c$ using the set of frequency resources R within a first sub-band and the corresponding set of frequency resources R' within the second sub-band, see FIG. 8 for the allocation of the frequency resources R and R', respectively.

The user device 600, which may be any of a User Equipment (UE), mobile station (MS), wireless terminal or mobile terminal, is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Figure 2:
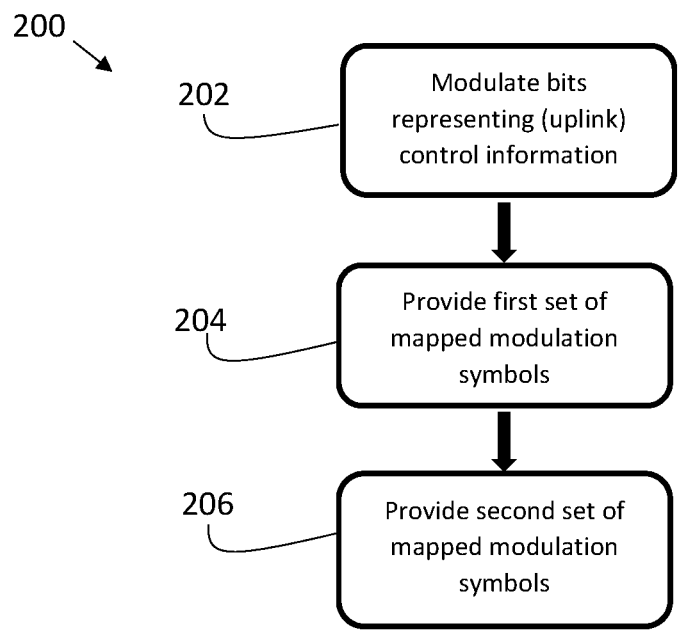
FIG. 2 shows a corresponding method according to an embodiment of the disclosure.

FIG. 2 shows a corresponding method 200 which may be executed in a transmitting device 100, such as the one shown in FIG. 1. The method 200 comprises modulating 202 bits representing (uplink) control information for providing at least a first set of modulation symbols M1 and a second set of modulation symbols M2. The method 200 further comprises providing 204 a first set of mapped modulation symbols M1' by mapping the first set of modulation symbols M1 onto a set of frequency resources R within a first sub-band. The method 200 further comprises providing 206 a second set of mapped modulation symbols M2' by mapping the second set of modulation symbols M2 onto a corresponding set of frequency resources R' within a second sub-band. According to the present solution the first set of mapped modulation symbols M1' and the second set of mapped modulation symbols M2' differ from each other in at least one modulation symbol. According to the present solution the first sub-band and the second sub-band are non-overlapping.

Figure 3:
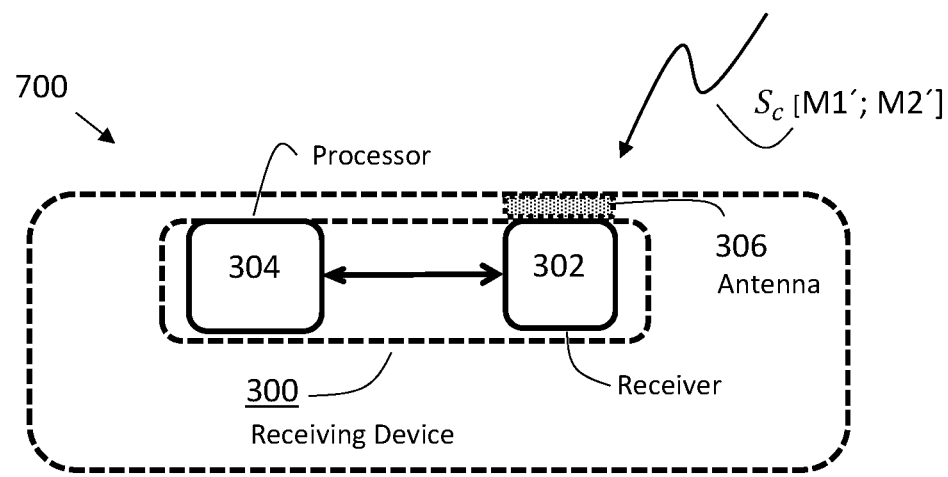
FIG. 3 shows a receiving device according to an embodiment of the disclosure.

FIG. 3 shows a receiving device 300 according to an embodiment of the disclosure. The receiving device 300 comprises a receiver 302 communicably coupled to a signal processor 304. The receiver 302 is configured to receive a control signal $S_c$ associated with a transmitting device 100. The control signal $S_c$ comprises at least a first set of modulation symbols M1 mapped onto a set of frequency resources R within a first sub-band, and a second set of modulation symbols M2 mapped onto a corresponding set of frequency resources R' within a second sub-band. According to embodiments of the disclosure the first set of mapped modulation symbols M1' and the second set of mapped modulation symbols M2' differ from each other in at least one modulation symbol and each set of mapped modulation symbols M1' and M2' are associated with the control information. The signal processor 304 is configured to derive the control information based on the control signal $S_c$.

In an embodiment, the signal processor 304 is configured to derive the control information based on at least the first set of mapped modulation symbols M1' and the second set of mapped modulation symbols M2'. This means that at least two sets of mapped modulation symbols are used in this respect for improved performance.

In a further embodiment, the receiving device 300 is part of, or integrated in a network node 700 which is also shown in FIG. 3. Hence, the control information associated with the transmitting device 100 may in this case be UCI and may comprise HARQ-ACK, CSI, and SR, by using different PUCCH formats.

In this disclosure a network node 700 may refer to a network control node or a network access node or an access point or a base station, e.g., a Radio Base Station (RBS), which in some networks may be referred to as transmitter, "eNB", "eNodeB", "NodeB" or "B node", depending on the technology and terminology used. The network nodes may be of different classes such as, e.g., macro eNodeB, home eNodeB or pico base station, based on transmission power and thereby also cell size. The network node can be an 802.11 access point or a Station (STA), which is any device that contains an IEEE 802.11-conformant Media Access Control (MAC) and Physical Layer (PHY) interface to the Wireless Medium (WM). The network node 100 is however not limited to the above mentioned communication devices.

Figure 4:
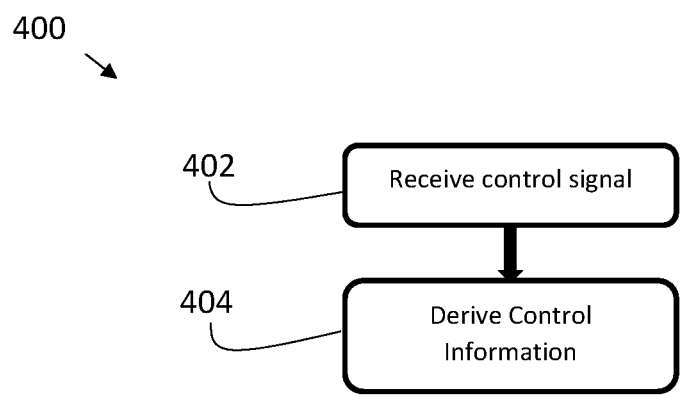
FIG. 4 shows a corresponding method according to an embodiment of the disclosure.

FIG. 4 shows a corresponding method 400 which may be executed in a receiving device 300, such as the one shown in FIG. 3. The method 400 comprises receiving 402 a control signal $S_c$ associated with a transmitting device 100. The control signal $S_c$ comprises at least a first set of modulation symbols M1 mapped onto a set of frequency resources R within a first sub-band, and a second set of modulation symbols M2 mapped onto a corresponding set of frequency resources R' within a second sub-band. The first set of mapped modulation symbols M1' and the second set of mapped modulation symbols M2' differ from each other in at least one modulation symbol and are associated with control information. The method 400 further comprises deriving 404 the control information based on the control signal $S_c$.

Figure 5:
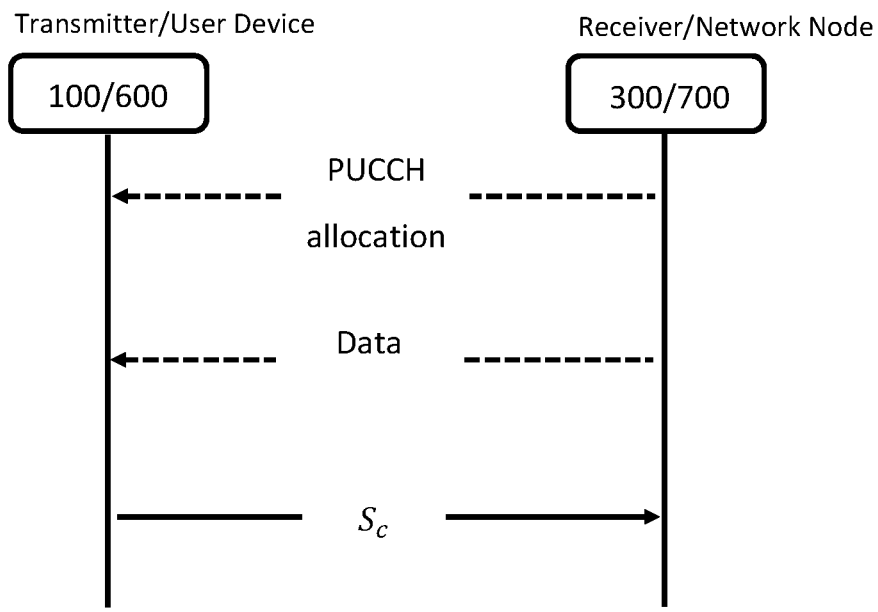
FIG. 5 illustrates signalling aspects according to an embodiment of the disclosure.

FIG. 5 shows signalling aspects of an embodiment of the disclosure. The transmitter device/user device 100/600 receives an optional PUCCH allocation signal from the receiving device/network node 300/700. The network node 700 allocates resources for the PUCCH, either dynamically or semi-statically and receives the PUCCH on the assigned resources. The user device 300 therefore transmits a control signal $S_c$ to the network node in the uplink 502 in the PUCCH on the assigned PUCCH resources.

FIG. 5 also shows how the network node 700 transmits data to the user device 600 which determines uplink control information based on the received data from the network node 700. The data sent by the network node 700 may relate to HARQ-ACK feedback, e.g. HARQ-ACK bits in response to data sent in the downlink from the eNodeB to the UE in the LTE context. Moreover, there are different types of uplink control information sent from the UE to the eNodeB in the LTE context, e.g. scheduling request which is a bit the UE sends to the eNodeB when it wants to be scheduled in the uplink; and channel state information which is measurements the UE does regarding the channel properties (e.g., channel quality, transmission rank, precoder matrix, etc.) which the UE sends back to the eNodeB.

Figure 6:
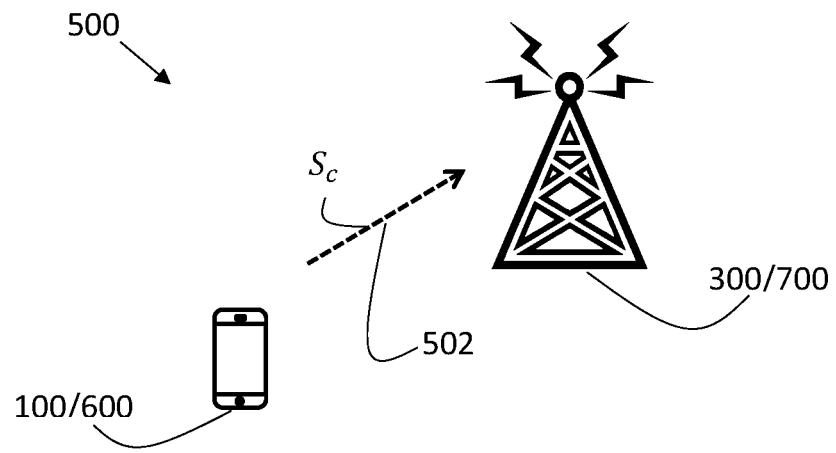
FIG. 6 illustrates a wireless communication system according to an embodiment of the disclosure.

FIG. 6 shows a corresponding wireless communication system 500 comprising at least one transmitting device/user device 100/600 and at least one receiving device/network node 300/700 according to embodiments of the disclosure. The user device 600 transmits a control signal $S_c$ to a network node 700 in the uplink 502. The control signal is a control signal $S_c$ as described previously.

In this disclosure the expressions "set" and "cluster" can be used interchangeably. A set or cluster of frequency resources refers to one or several frequency contiguous resources, e.g., one or several REs/PRBs, and clusters may or may not be consecutively located. The clusters are non-overlapping, i.e., they have no resources in common. Further, most of the following examples and embodiments are described in a 3GPP LTE or LTE Advanced context with its relevant terminology and expressions. Embodiments of the disclosure are however not limited thereof and may be used in any suitable wireless communication system.

Figure 7:
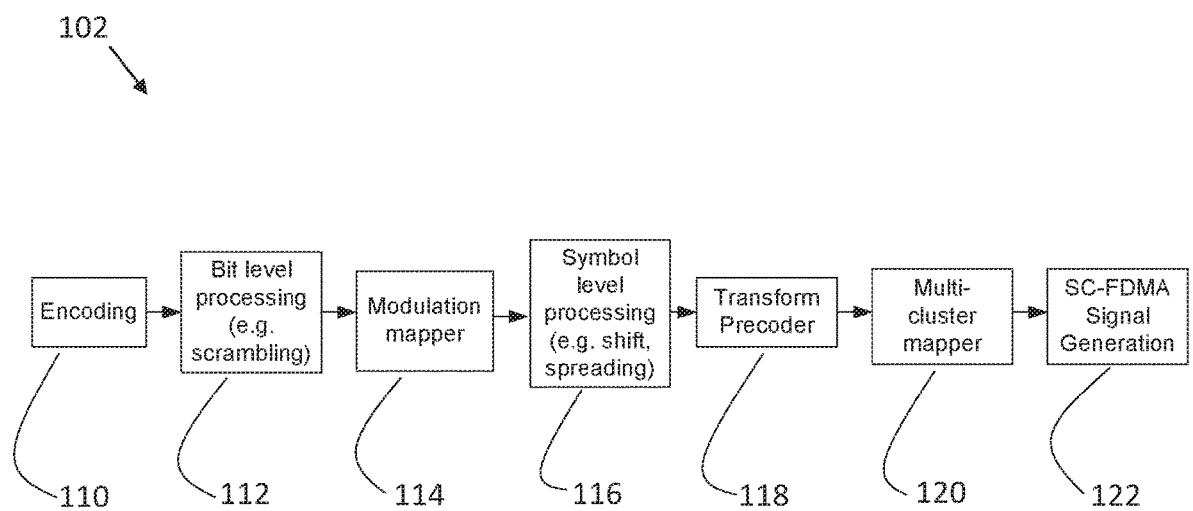
FIG. 7 shows a block diagram according to an embodiment of the disclosure.

A general multi-cluster PUCCH signal generation block diagram is shown in FIG. 7, where not all the blocks/steps are needed for a specific PUCCH format. The functional blocks/steps in FIG. 7 may be comprised/executed in the present signal processor 102 of the transmitting device 100. It is noted that the corresponding steps, such as decoding, descrambling, demodulation, demapping, etc., are performed in the receiving device 300.

The encoding block 110 may comprise different channel coding schemes, e.g., block code or tail biting convolutional coding, with or without CRC (Cyclic Redundancy Check) attachment.

The bit level processing block 112 may comprise scrambling and interleaving.

The modulation mapper block 114 takes as input the bits, which are mapped to modulation symbols, e.g., BPSK (Binary Phase Shift Keying) or QPSK (Quarternary PSK) symbols. The modulation mapper may perform the mapping e.g., according to Gray mapping. The modulation mapper can further produce modulation symbols which are obtained from sequences. For example, bits can be mapped to sequences or products of different sequences, where typical sequences include Zadoff-Chu sequences and Orthogonal Cover Codes (e.g., Hadamard sequences, cyclically shifted exponential sequences).

The symbol level processing block 116 may comprise cyclic shifts, interleaving, sequence modulation and spreading.

Figure 8:
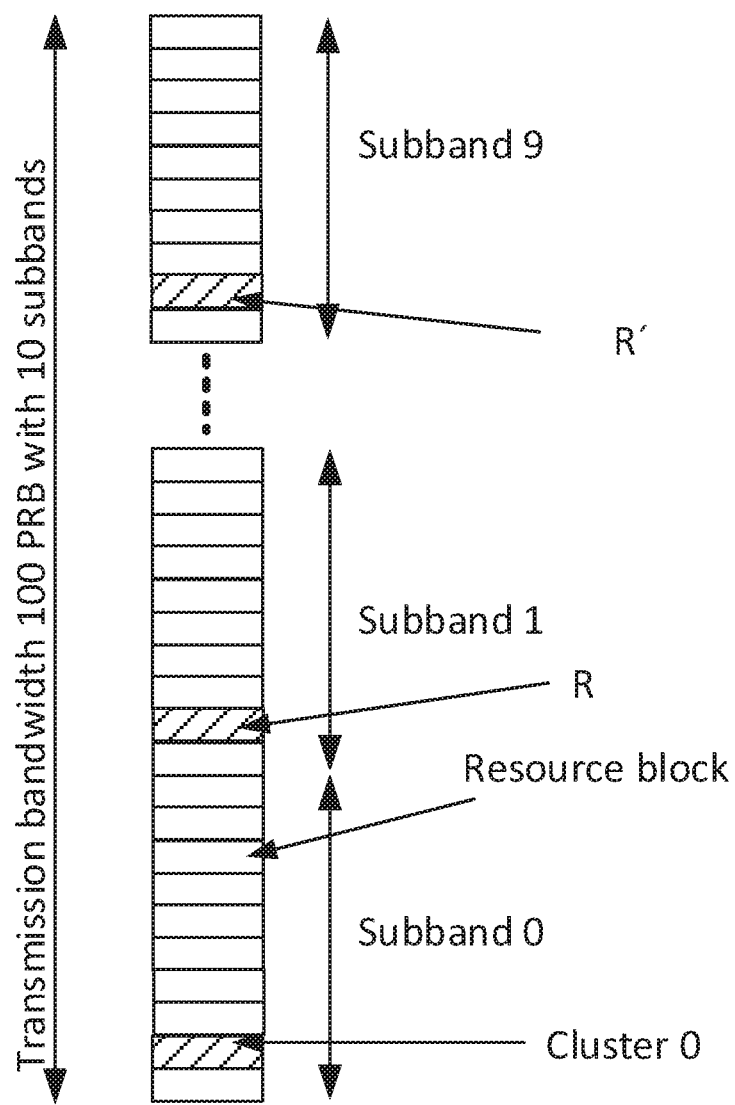
FIG. 8 illustrates resource allocation in different sub-bands.

The multi-cluster mapper block 120 maps modulated symbols to sets/clusters, uniformly spaced in the frequency domain. In one embodiment of multi-cluster mapper 120, each cluster comprises $12 M_{RB}^{PUCCH}$ REs, i.e., 12 REs per PRB, where $M_{RB}^{PUCCH}$ is the PUCCH bandwidth in PRBs (of the corresponding PUCCH format defined in LTE), which is 1 for PUCCH format 3/5 and potentially larger than 1 for PUCCH format 4. An illustration of multi-cluster PUCCH with 10 clusters, each cluster consisting of 1 PRB for a 100 PRB carrier bandwidth, is shown in FIG. 8. Here, the bandwidth is divided into 10 sub-bands, each comprising 10 RBs. The set R and R' include the second RB in the respective sub-band. The actual PUCCH transmission will thus occupy 10 PRBs located uniformly over 100 PRBs. The principles herein could be generalized even for other number of clusters.

In another example of multi-cluster mapper 120, each cluster comprises 12 REs (i.e., 1 PRB) even when $M_{RB}^{PUCCH} > 1$. Thus, if $M_{RB}^{PUCCH}$ is not larger than the total number of allocated PRBs (e.g., 10), modulation symbols are first mapped to $M_{RB}^{PUCCH}$ clusters and may be repeated in some of the remaining clusters. Alternatively, some of the remaining clusters could be left empty. This allows using less total number of RBs for a given bandwidth $M_{RB}^{PUCCH}$ than for the multi-cluster mapper defined above. Thus, the modulation symbols may become the same in some clusters while being different in some clusters. For example, $M_{RB}^{PUCCH} = 5$ and there are 10 clusters each consisting of 1 PRB pair, the modulation symbols are first mapped to cluster 0 to 4 and then repeated for the remaining clusters 5 to 9. Thus different modulation symbols may be contained in cluster 0 to 4. Then the same mapping is repeated and applied for cluster 5 to 9 (note: any other predetermined mapping with repetition may also be used). Thus the same modulation symbols are mapped to cluster 0 and 5; 1 and 6; 2 and 7; 3 and 8; 4 and 9. The skilled reader may understand that similar mapping could be used even when the total number of clusters is not divisible by $M_{RB}^{PUCCH}$. For which case either some clusters may be left empty or different clusters may be repeated different number of times.

The SC-FDMA waveform, generated in the SC-FDMA signal generator block 122 in FIG. 7, is in LTE such that the time-continuous low-pass signal $s_l^{(p)}(t)$ for antenna port p in SC-FDMA symbol 1 in an uplink slot is defined by:

$$s_l^{(p)}(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k^{(-)},l}^{(p)} \cdot e^{j2\pi(k+1/2)\Delta f(t - N_{CP,l} T_s)}$$

for $0 \leq t < (N_{CP,1} + N) \times T_s$ where $k^{(-)} = k + \lfloor N_{RB}^{UL} N_{sc}^{RB}/2 \rfloor$. The variable N equals 2048 for $\Delta f = 15$ kHz subcarrier spacing and $a_{k,l}^{(p)}$ is the content of resource element (k, l) on antenna port p. The entities $T_s$, $N_{CP,1}$, $N_{RB}^{UL}$ and $N_{sc}^{RB}$ are further defined in the LTE specifications. The SC-FDMA waveform without a cyclic prefix can be defined by:

$$s(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k + \lfloor N_{RB}^{UL} N_{sc}^{RB}/2 \rfloor} \cdot e^{j2\pi(k+1/2)\Delta f t}$$

for $0 \leq t < N \times T_s$. According to the LTE standard, $$N = \frac{f_s}{\Delta f} \leq N_{RB}^{UL} N_{sc}^{RB},$$

hence it is possible to define:

$$H[k] = \begin{cases} a_{k+\lfloor N_{RB}^{UL} N_{sc}^{RB}/2 \rfloor}, & -\lfloor N_{RB}^{UL} N_{sc}^{RB}/2 \rfloor \leq k \leq \lceil N_{RB}^{UL} N_{sc}^{RB}/2 \rceil - 1 \\ 0, & \text{elsewhere} \end{cases}$$

and $$s(t) = \sum_{k=-\lfloor N/2 \rfloor}^{\lceil N/2 \rceil - 1} H[k] \cdot e^{j2\pi(k+1/2)\Delta ft}.$$

The sampled version is obtained by setting: $t=n/f_s$ which gives (comprising a normalisation factor $1/\sqrt{N}$), a low-pass equivalent signal:

$$s[n] = \frac{1}{\sqrt{N}} \sum_{k=-\lfloor N/2 \rfloor}^{\lceil N/2 \rceil - 1} H[k] \cdot e^{\frac{j2\pi n(k+1/2)}{N}}$$

for $n=0,1,\ldots,N-1$ where $H[k]$ is a Fourier coefficient at frequency $k$.

The Fourier coefficients are obtained by DFT preceding in 118 the modulation symbols $X_m$ as:

$$H[k] = \frac{1}{\sqrt{M}} \sum_{m=0}^{M-1} X_m e^{-j2\pi \frac{mk}{M}}, k = 0, 1, \ldots, M-1$$

If the same Fourier coefficient is used in multiple clusters, it can be realized from the low-pass equivalent signal representation that the PAPR/CM of the signal may increase. As an illustrative example, if $H[k]=H[k+\Delta]$, then $$s[n] = H[k]e^{j2\pi(k+1/2)\frac{n}{N}} \left(1 + e^{j2\pi \frac{\Delta \cdot n}{N}}\right),$$

and for certain n, the factor $$\left(1 + e^{j2\pi \frac{\Delta \cdot n}{N}}\right) = 2.$$

Further generalizing $H[k]=H[k+\Delta \cdot p]$, $p=0,1,\ldots,P-1$, it can be found that $$s[n] = H[k]e^{j2\pi(k+1/2)\frac{n}{N}} \sum_{p=0}^{P-1} e^{j2\pi p \frac{\Delta \cdot n}{N}} =$$

$$H[k]e^{j2\pi(k+1/2)\frac{n}{N}} \frac{\sin\left(\frac{1}{2} \cdot P \cdot 2\pi \frac{\Delta \cdot n}{N}\right)}{\sin\left(\frac{1}{2} \cdot 2\pi \frac{\Delta \cdot n}{N}\right)} \cdot e^{j2\pi \frac{\Delta \cdot n}{N}(P-1)/2}.$$

It follows that for certain n, $$\frac{\sin\left(\frac{1}{2} \cdot P \cdot 2\pi \frac{\Delta \cdot n}{N}\right)}{\sin\left(\frac{1}{2} \cdot 2\pi \frac{\Delta \cdot n}{N}\right)} \cdot e^{j2\pi \frac{\Delta \cdot n}{N}(P-1)/2} = P.$$

That is, repeating Fourier coefficients could result in constructive addition of subcarriers leading to large power dynamics of the signal. It is noted that the same conclusion holds without a DFT precoder, for which the Fourier coefficient becomes the same as the modulation symbol $X_m$. Hence, it is disclosed herein to avoid repetition of Fourier coefficients/modulation symbols in the SC-FDMA signal.

Accordingly, in an embodiment of the disclosure, the signal processor 102 of the transmitting device 100 is configured to provide a first set of precoded modulation symbols M1 and a second set of precoded modulation symbols M2 by DFT preceding the first set of modulation symbols M1 and the second set of modulation symbols M2. The signal processor 102 of the transmitting device 100 is further configured to provide the first set of mapped modulation symbols M1' by mapping the first set of precoded modulation symbols M1 onto the set of frequency resources R within the first sub-band, and provide the second set of mapped modulation symbols M2' by mapping the second set of precoded modulation symbols M2 onto a corresponding set of frequency resources R' within a second sub-band.

In one embodiment the following holds:
One DFT precoder is applied per sub-band, i.e. each DFT precoder is sub-band specific;
The UCI is used to generate one set of modulation symbols/bits which is used in all sub-bands of the transmission bandwidth;
In each sub-band the generated set of modulation symbols/bits are processed differently to result in different modulation symbols/bits in different sub-bands.

By different modulation symbols/bits in different sub-bands, it should be understood that it includes that at least one modulation symbol/bit is different among the two sub-bands. In particular, if a DFT precoder is applied, the difference could be observed after the DFT precoder. That is the difference should be viewed on the sets of modulation symbols mapped to the time-frequency resources.

Hence, the signal processor 102 is configured to precode the first set of modulation symbols M1 using a first sub-band specific DFT precoder for the first sub-band and precode the second set of modulation symbols M2 using a second sub-band specific DFT precoder for the second sub-band.

Figure 9:
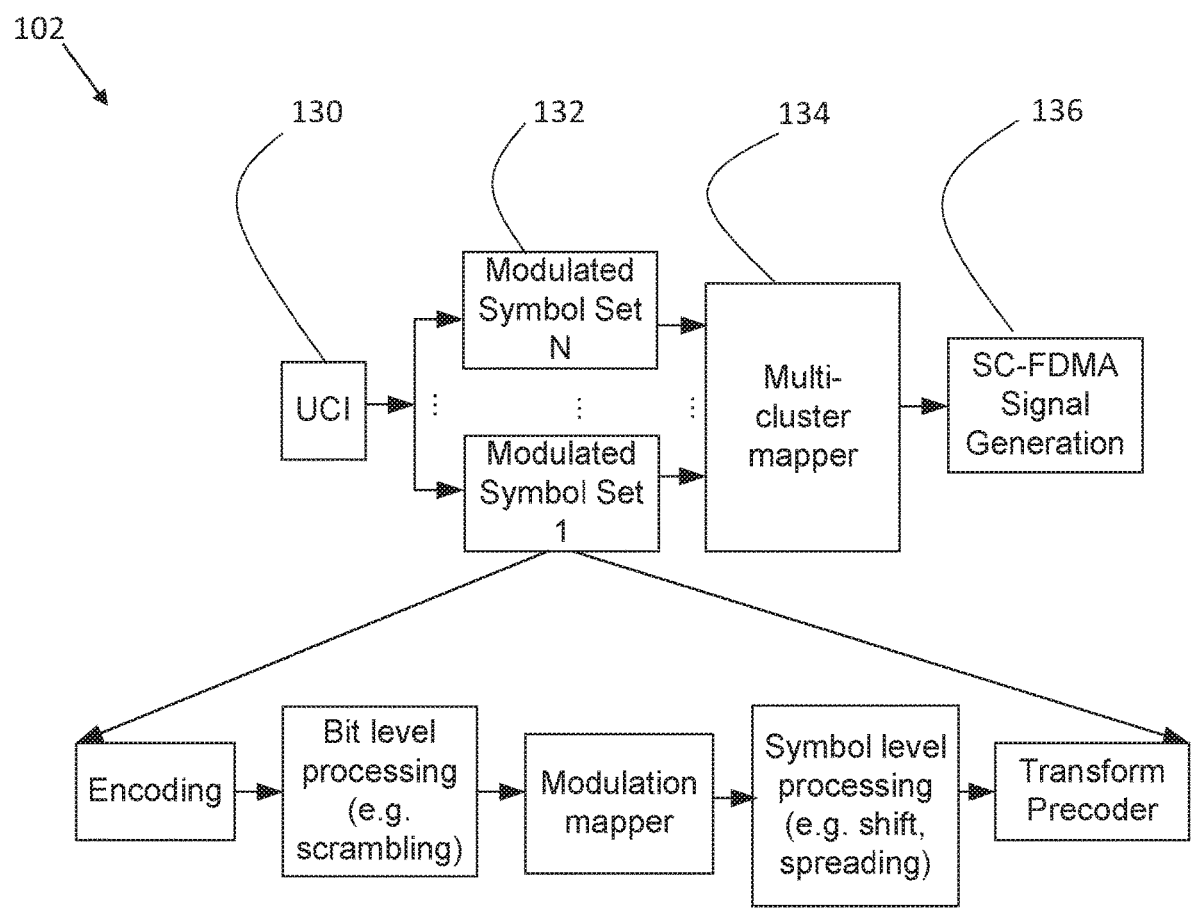
FIG. 9 illustrates an embodiment of DFT precoding.

One example of this embodiment is provided in FIG. 9. The UCI is provided by UCI providing block 130. The modulated symbol set derived from the UCI can be done with the procedures comprising encoding, bit level processing, modulation mapping, symbol level processing and transform precoding in modulated symbol generation blocks 132 for modulated symbol sets 1, 2, ..., N (wherein N is a positive integer). In the present embodiment, the transform precoding is also named as DFT precoding. The post DFT precoder symbols are mapped to multi-clusters in multi-cluster mapper block 134 and then processed with SC-FDMA signal generation in signal generation block 136. The signal generation is performed in the transmitting device 100. Corresponding steps, e.g., decoding, descrambling, demodulation, demapping, etc. are performed in the receiving device 300.

This embodiment is advantageous because:

For each cluster, the existing LTE PUCCH format is largely reused which allows a simple implementation of the PUCCH transmitting device 100 and receiving device 300; and The CM performance is reduced as the modulation symbols are different across clusters.

The generation of the different modulated symbol sets corresponding to the same UCI can be done by cluster specific processing either at bit level or symbol level. For the bit level processing, one way is to perform cluster specific scrambling. For the symbol processing, one way is to perform cluster specific cyclic modulation symbol shifting. Cluster specific should in this disclosure be understood to include sub-band specific or PRB-specific processing.

One example of generating multi-cluster PUCCH, by scrambling, is:

Generate the encoded $M_{bit}$ bits $b(0), \ldots, b(M_{bit}-1)$ from the UCI by channel coding, which may or may not comprise CRC attachment and rate matching. The rate matching is done assuming $M_{RB}^{PUCCH}$ PRB(s) is (are) used for PUCCH. The value of $M_{RB}^{PUCCH}$ may be different from the number of PRBs of the allocated clusters for the PUCCH transmission.

Generate different sets of modulated symbols from $b(0), \ldots, b(M_{bit}-1)$ by bit level scrambling, modulation mapper, symbol level processing and transform precoder, where each set of modulated symbols is associated with an SC-FDMA symbol.

The sets of DFT precoded symbols are mapped to the clusters and the SC-FDMA signal is generated.

Therefore, the signal processor 102 is configured to scramble the bits representing the control information using a first sub-band specific scrambling sequence for the first sub-band and a second sub-band specific scrambling sequence for the second sub-band so as to provide a first scrambled sequence and a second scrambled sequence. The signal processor 102 is configured to modulate the first scrambled sequence and the second scrambled sequence so as to provide the first set of modulation symbols M1 and the second set of modulation symbols M2.

The different modulated symbol sets derived from the following: the block of bits $b(0), \ldots, b(M_{bit}-1)$ shall be scrambled with a cluster (sub-band) specific scrambling sequence, resulting in a block of scrambled bits $\tilde{b}(0), \ldots, \tilde{b}(M_{bit}-1)$. This could be done by $\tilde{b}(i)=(b(i)+c(i))\bmod 2$, where the scrambling sequence $c(i)$ is a sequence defined in 3GPP TS 36.211 clause 7.2.

The pseudo-random scrambling sequence generator can utilize cluster or sub-band specific parameters, e.g., it can be initialized with $c_{init}=(N_{ID}^{cluster}+1)(\lfloor n_s/2 \rfloor+1)\cdot(2N_{ID}^{cell}+1)\cdot 2^{16}+n_{RNTI}$ at the start of each subframe where $n_{RNTI}$ is the Cell-Radio Network Temporary Identifier (C-RNTI), $n_s$ is the slot number within a radio frame, $N_{ID}^{cell}$ is the cell identity, and $N_{ID}^{cluster}$ is a cluster parameter (e.g., a PRB index, or a cluster index).

An advantage of scrambling is that it has low-complexity as it does not require any multiplications. It also requires minimum change to existing PUCCH formats and therefore reduces the cost and implementation complexity of the transmitter and receiver.

One example of generating multi-cluster PUCCH is to cyclically shift the order of the modulation symbols. The symbol level processing could apply a cluster specific modulation symbol shift or interleaver, e.g., $\tilde{d}(i)=d((i+n_{cs}^{cell}(n_s, l)+N_{ID}^{cluster})\bmod 12)$, where $d(i)$ is the cluster-specific modulation symbol sequence, $\tilde{d}(i)$ is the cluster-specific modulation symbol sequence after cyclic shifts, $n_{cs}^{cell}(n_s, l)$ is given by 3GPP TS 36.211 clause 5.4, $n_s$ is the slot number within a radio frame and $l$ is the SC-FDMA symbol number within a slot. An interleaver provides more randomization than a cyclic shift since it is not constrained to change the order by cyclic shifts only.

Therefore, the signal processor 102 is configured to interleave the first set of modulation symbols M1 using a first sub-band specific interleaver for the first sub-band and interleave the second set of modulation symbols M2 using a second sub-band specific interleaver for the second sub-band. Thereby, the first set of modulation symbols M1 and the second set of modulation symbols M2 are provided.

Therefore, the signal processor 102 is configured to cyclically shift the positions of the modulation symbols in the first set of modulation symbols M1 so as to provide the second set of modulation symbols M2, or cyclically shift the positions of the modulation symbols in the second set of modulation symbols (M2) so as to provide the first set of modulation symbols M1.

An advantage of cyclic shifting is that it has low-complexity as it does not require any multiplications. It also requires minimum change to existing PUCCH formats and therefore reduces the cost and implementation complexity of the transmitter and receiver.

One example of generating multi-cluster PUCCH is to multiply the modulation symbols in a cluster with a sub-band specific value being a complex or real value, and using different such values for different clusters. The complex or real values could be taken from a pre-defined sequence having a length equal to the number of clusters according to an embodiment.

Therefore, the signal processor 102 is configured to multiply the first set of modulation symbols M1 using a first sub-band specific complex or real value for the first sub-band and multiply the second set of modulation symbols M2 using a second sub-band specific complex or real value for the second sub-band. Thereby, the first set of modulation symbols M1 and the second set of modulation symbols M2 are provided.

The symbol level processing could apply a cluster specific modulation symbol multiplication, e.g., $\tilde{d}(i)=s(i)d((i+n_{cs}^{cell}(n_s, l))\bmod 12)$, where $d(i)$ is the cluster-specific modulation symbol sequence, $s(i)$ is the cluster-specific sequence (i.e., $s(i)$ assumes the same value for all modulation symbols within a cluster), $n_{cs}^{cell}(n_s, l)$ is given by 3GPP TS 36.211 clause 5.4, $n_s$ is the slot number within a radio frame and $l$ is the SC-FDMA symbol number within a slot.

Examples of sequences $s(i)$ could be such that only infer phase shifts of the modulation symbols (e.g., BPSK and QPSK-based sequences) or other sequences with desirable PAPR/CM properties, such as Zadoff-Chu sequences or Golay sequences.

The cubic metric performance is evaluated assuming multiple cluster structure, with different post-DFT modulated symbol sets and same post-DFT modulated symbol sets. The cubic metric is defined as:

$$CM = \frac{20\log_{10}\{\mathrm{rms}[v_{norm}^3(t)]\} - 20\log_{10}\{\mathrm{rms}[vref_{norm}^3(t)]\}}{K}\,\mathrm{dB}$$

where $20\log_{10}\{\mathrm{rms}[vref_{norm}^3(t)]\}=1.52$ dB is the raw cubic metric of the Wideband Code Division Multiple Access (W-CDMA) voice reference signal, and K is 1.56.

There are 10 clusters with multiple different post-DFT modulated symbol sets each mapped to one cluster, and multiple same post-DFT modulated symbol sets each mapped to one cluster. The transmission bandwidth is 100 PRB and each cluster is 1 PRB. The symbols are QPSK modulated. It can be observed in Table 1 below that significant CM reduction can be achieved by using scrambling or cyclic shifting.

TABLE 1

Cubic metric performance for multi-cluster transmission.

|  | With bit scrambling | With cyclic shifting | With sequence modulation | Without bit scrambling or cyclic shifting |
|---|---|---|---|---|
| CM(dB) | 3.70 | 3.6 | 3.8 | 12.4 |

By performing the cluster specific operation into the generation of the multiple different post-DFT modulated symbol sets, different modulated symbols are mapped to different clusters before SC-FDMA signal generation, which achieves significant CM performance reduction over mapping the same modulated symbol set to different clusters.

In another embodiment the following holds:

One single DFT precoder is applied to all sub-bands of the transmission bandwidth;

The UCI is used to generate one set of modulation symbols/bits which is used in all clusters/sub-bands;

In each cluster, the set of modulation symbols/bits are processed in the same way to generate the same modulation symbols/bits in different clusters prior to the DFT precoder.

Hence, the first set of modulation symbols M1 and the second set of modulation symbols M2 are identical in this embodiment. Further, the signal processor 102 is configured to precode the first set of modulation symbols M1 and the second set of modulation symbols M2 using a single DFT precoder for the first sub-band and the second sub-band.

Figure 10:
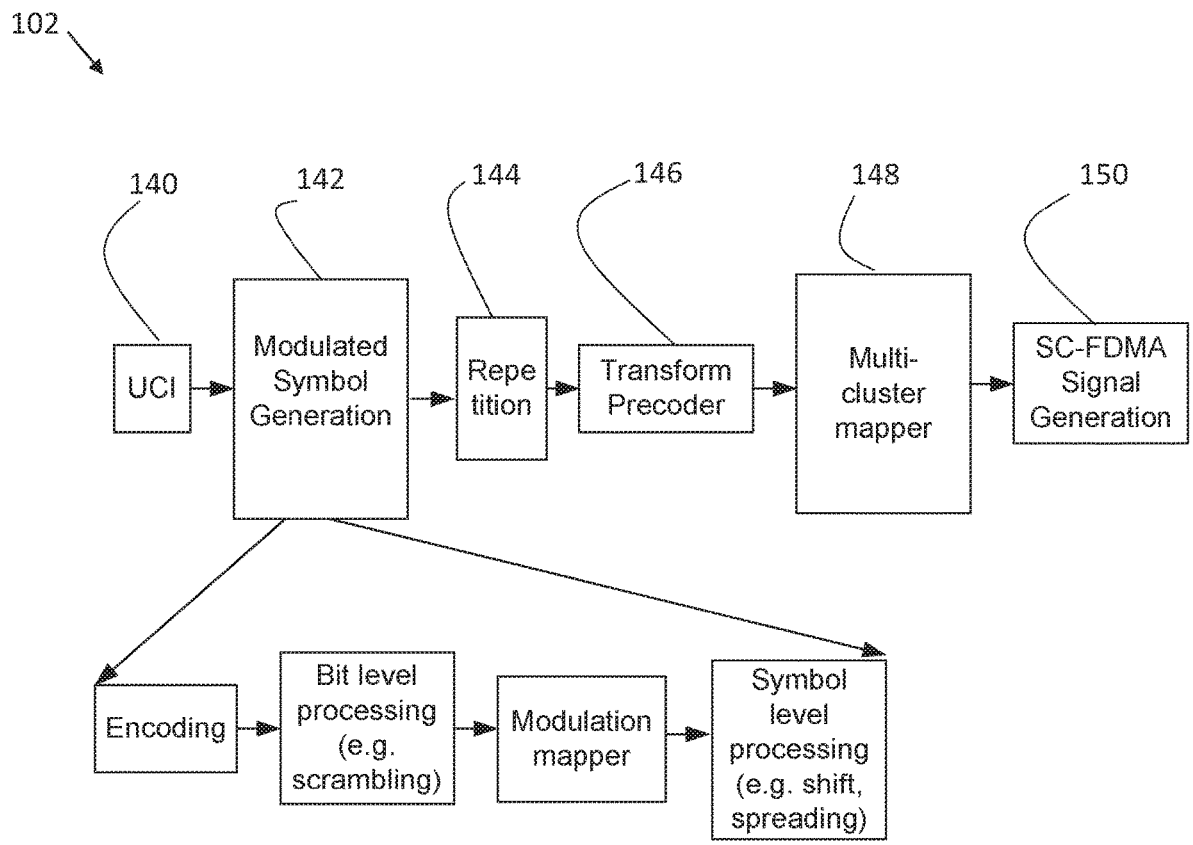
FIG. 10 illustrates another embodiment of DFT precoding.

One example of this embodiment with a single DFT precoder for all sub-bands is provided in FIG. 10. Only one set of modulated symbols is derived from the UCI which is provided by UCI provider block 140. The modulated symbol set derived from the UCI can be done with the procedures comprising encoding, bit level processing, modulation mapping and symbol level processing by modulated symbol generation block 142. The modulated symbols are repeated by several times in repetition block 144, and then processed with the single DFT precoder in transform precoder block 146. The post DFT precoder symbols are mapped to multi-clusters in multi-cluster block 148 and then processed to produce the SC-FDMA signal in signal generation block 150. The signal generation is performed in the transmitting device 100. Corresponding blocks/steps, e.g., decoding, descrambling, demodulation, demapping, etc. are performed in the receiving device 300.

This embodiment is advantageous because:

For each cluster, the PUCCH format is largely reused which allows simple implementation of the PUCCH receiving device 100 and transmitting device 300; and The cubic metric performance is reduced as the modulation symbols are different across different clusters.

One example of generating multi-cluster PUCCH based on a PUCCH format defined for $M_{RB}^{PUCCH} > 1$ is:

Generate the encoded bits $b(0), \ldots, b(M_{bit}-1)$ from the UCI by channel coding, which may or may not comprise CRC attachment and rate matching. The rate matching is done assuming $M_{RB}^{PUCCH}$ PRB(s) is(are) used for PUCCH. The value of $M_{RB}^{PUCCH}$ may be different from the number of PRBs of the allocated clusters for the PUCCH transmission;

Generate a set of modulation symbols from $b(0), \ldots, b(M_{bit}-1)$ by bit level scrambling, modulation mapper, symbol level processing, where each set is associated with an SC-FDMA symbol;

For each SC-FDMA symbol, the $12M_{RB}^{PUCCH}$ complex-valued symbols are repeated to match the number of PRBs of the clusters;

For each SC-FDMA symbol, a single DFT precoder is applied to the repeated modulation symbols in all clusters and the SC-FDMA signal is generated.

An advantage of using a single DFT precoder for all clusters is that the CM/PAPR can be made very low.

By applying a single DFT precoder for multiple repeated modulated symbol sets, different modulated symbols are derived and mapped to different clusters before SC-FDMA signal generation, which achieves significant CM performance reduction over mapping the same modulated symbol set to different clusters. Table 2 below shows that, for the same example as above, the cubic metric can be reduced to low levels.

TABLE 2

Cubic metric performance for multi-cluster transmission.

|  | With 120-point DFT |
|---|---|
| CM(dB) | 2.20 |

It can be noted that due to the repetition of the modulation symbols, the computation of the DFT can decreased, as can be seen from the following example. Let $X=[X_0, X_1, \ldots, X_{M-1}, X_0, X_1, \ldots, X_{M-1}, \ldots, X_0, X_1, \ldots, X_{M-1}]$ be a vector of length N, containing N/M repetitions, such that $X_k = X_{k+Mp}$ for an integer $$p = 0, 1, \ldots, \frac{N}{M} - 1.$$

For n=0, 1, ..., N−1, $$Y_n = \sum_{k=0}^{N-1} X_k e^{-i2\pi \frac{nk}{N}}$$

$$= \sum_{k=0}^{M-1} X_k \sum_{p=0}^{\frac{N}{M}-1} e^{-i2\pi \frac{n(k+Mp)}{N}}$$

$$= \sum_{p=0}^{\frac{N}{M}-1} e^{-i2\pi \frac{npM}{N}} \sum_{k=0}^{M-1} X_k e^{-i2\pi \frac{nk}{N}}$$

$$= \begin{cases} \frac{N}{M} \sum_{k=0}^{M-1} X_k e^{-i2\pi \frac{pk}{N}}, & n = p\frac{N}{M}, p = 0, 1, \ldots \\ 0, & \text{otherwise} \end{cases}$$

Hence, the complexity of the N-point DFT is similar to an M-point DFT.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the user device 600 and network node 700 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the signal processors may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

According to another embodiment of the present invention, a method (200) comprising
modulating (202) bits representing control information for providing at least a first set of modulation symbols (M1) and a second set of modulation symbols (M2),
providing (204) a first set of mapped modulation symbols (M1') by mapping the first set of modulation symbols (M1) onto a set of frequency resources (R) within a first sub-band, and
providing (206) a second set of mapped modulation symbols (M2') by mapping the second set of modulation symbols (M2) onto a corresponding set of frequency resources (R') within a second sub-band,
wherein the first set of mapped modulation symbols (M1') and the second set of mapped modulation symbols (M2') differ from each other in at least one modulation symbol, and
wherein the first sub-band and the second sub-band are non-overlapping.

According to another embodiment of the present invention, a method (400) comprising
receiving (402) a control signal ($S_c$) associated with a transmitting device (100), the control signal ($S_c$) comprising at least a first set of modulation symbols (M1) mapped onto a set of frequency resources (R) within a first sub-band, and a second set of modulation symbols (M2) mapped onto a corresponding set of frequency resources (R') within a second sub-band, wherein the first set of mapped modulation symbols (M1') and the second set of mapped modulation symbols (M2') differ from each other in at least one modulation symbol and are associated with control information;
deriving (404) the control information based on the control signal ($S_c$).

What is claimed is:

1. A transmitting device for a wireless communication system, the transmitting device comprising:
a signal processor configured to:
modulate bits representing control information for providing at least a first set of modulation symbols and a second set of modulation symbols,
provide a first set of mapped modulation symbols by mapping the first set of modulation symbols onto a set of frequency resources within a first sub-band,
provide a second set of mapped modulation symbols by mapping the second set of modulation symbols onto a corresponding set of frequency resources within a second sub-band, wherein the first set of mapped modulation symbols and the second set of mapped modulation symbols differ from each other in at least one modulation symbol, and wherein the first sub-band and the second sub-band are non-overlapping,
scramble the bits representing the control information using a first sub-band specific scrambling sequence for the first sub-band and a second sub-band specific scrambling sequence for the second sub-band so as to provide a first scrambled sequence and a second scrambled sequence, and
modulate the first scrambled sequence and the second scrambled sequence so as to provide the first set of modulation symbols and the second set of modulation symbols.

2. The transmitting device according to claim 1, wherein the signal processor is configured to:
generate the first sub-band specific scrambling sequence using a pseudo-random sequence with a first sub-band specific initialization value for the first sub-band, and generate the second sub-band specific scrambling sequence using a pseudo-random sequence with a second sub-band specific initialization value for the second sub-band.

3. The transmitting device according to claim 1, wherein the signal processor is configured to:
cyclically shift the positions of the modulation symbols in the first set of modulation symbols so as to provide the second set of modulation symbols, or cyclically shift the positions of the modulation symbols in the second set of modulation symbols so as to provide the first set of modulation symbols.

4. The transmitting device according to claim 1, wherein the signal processor is configured to:
interleave the first set of modulation symbols using a first sub-band specific interleaver for the first sub-band, and interleave the second set of modulation symbols using a second sub-band specific interleaver for the second sub-band.

5. The transmitting device according to claim 1, wherein the signal processor is configured to:
multiply the first set of modulation symbols using a first sub-band specific complex or real value for the first sub-band, and multiply the second set of modulation symbols using a second sub-band specific complex or real value for the second sub-band.

6. The transmitting device according to claim 1, wherein the signal processor is configured to:
provide a first set of precoded modulation symbols and a second set of precoded modulation symbols by Discrete Fourier Transform (DFT) the first set of modulation symbols and the second set of modulation symbols, provide the first set of mapped modulation symbols by mapping the first set of precoded modulation symbols onto the set of frequency resources within the first sub-band, and provide the second set of mapped modulation symbols by mapping the second set of precoded modulation symbols onto the corresponding set of frequency resources within the second sub-band.

7. The transmitting device according to claim 6, wherein the signal processor is configured to:

precode the first set of modulation symbols using a first sub-band specific DFT precoder for the first sub-band and precode the second set of modulation symbols using a second sub-band specific DFT precoder for the second sub-band.

8. The transmitting device according to claim 6, wherein the first set of modulation symbols and the second set of modulation symbols are identical, and wherein the signal processor is configured to:

precode the first set of modulation symbols and the second set of modulation symbols using a single DFT precoder for the first sub-band and the second sub-band.

9. The transmitting device according to claim 1, wherein the signal processor is configured to:

generate a control signal based on the first set of mapped modulation symbols and the second set of mapped modulation symbols, wherein the transmitting device further comprises a transmitter configured to:

transmit the control signal using the set of frequency resources within a first sub-band and the corresponding set of frequency resources within the second sub-band.

10. A receiving device for a wireless communication system, the receiving device comprising:

a receiver configured to:

receive a control signal associated with a transmitting device, the control signal comprising at least a first set of modulation symbols mapped onto a set of frequency resources within a first sub-band, and a second set of modulation symbols mapped onto a corresponding set of frequency resources within a second sub-band, wherein the first set of mapped modulation symbols and the second set of mapped modulation symbols differ from each other in at least one modulation symbol and are associated with control information; and a signal processor configured to:

derive the control information based on the control signal, wherein bits representing the control information are scrambled using a first sub-band specific scrambling sequence for the first sub-band and a second sub-band specific scrambling sequence for the second sub-band so as to provide a first scrambled sequence and a second scrambled sequence, further the first scrambled sequence and the second scrambled sequence are modulated so as to provide the first set of modulation symbols and the second set of modulation symbols.

11. The receiving device according to claim 10, wherein the signal processor is configured to:

derive the control information based on at least the first set of mapped modulation symbols and the second set of mapped modulation symbols.

12. A non-transitory computer readable medium, comprising processor-executable instructions which when executed cause a processor to implement first operations including:

modulating bits representing control information for providing at least a first set of modulation symbols and a second set of modulation symbols, providing a first set of mapped modulation symbols by mapping the first set of modulation symbols onto a set of frequency resources within a first sub-band, and providing a second set of mapped modulation symbols by mapping the second set of modulation symbols onto a corresponding set of frequency resources within a second sub-band, wherein the first set of mapped modulation symbols and the second set of mapped modulation symbols differ from each other in at least one modulation symbol, and wherein the first sub-band and the second sub-band are non-overlapping, scrambling the bits representing the control information using a first sub-band specific scrambling sequence for the first sub-band and a second sub-band specific scrambling sequence for the second sub-band so as to provide a first scrambled sequence and a second scrambled sequence, modulating the first scrambled sequence and the second scrambled sequence so as to provide the first set of modulation symbols and the second set of modulation symbols;

or implement second operations including:

receiving a control signal associated with a transmitting device, the control signal comprising at least the first set of modulation symbols mapped onto the set of frequency resources within the first sub-band, and the second set of modulation symbols mapped onto the corresponding set of frequency resources within the second sub-band, wherein the first set of mapped modulation symbols and the second set of mapped modulation symbols differ from each other in at least one modulation symbol and are associated with control information, and deriving the control information based on the control signal, wherein the bits representing the control information are scrambled using the first sub-band specific scrambling sequence for the first sub-band and the second sub-band specific scrambling sequence for the second sub-band so as to provide the first scrambled sequence and the second scrambled sequence, further the first scrambled sequence and the second scrambled sequence are modulated so as to provide the first set of modulation symbols and the second set of modulation symbols.

13. The non-transitory computer readable medium according to claim 12, wherein the first operations include:

generating the first sub-band specific scrambling sequence using a pseudo-random sequence with a first sub-band specific initialization value for the first sub-band, and generating the second sub-band specific scrambling sequence using a pseudo-random sequence with a second sub-band specific initialization value for the second sub-band.

14. The non-transitory computer readable medium according to claim 12, wherein the first operations include:

cyclically shifting the positions of the modulation symbols in the first set of modulation symbols so as to provide the second set of modulation symbols, or cyclically shifting the positions of the modulation symbols in the second set of modulation symbols so as to provide the first set of modulation symbols.

15. The non-transitory computer readable medium according to claim 12, wherein the first operations include:
interleaving the first set of modulation symbols using a first sub-band specific interleaver for the first sub-band, and interleaving the second set of modulation symbols using a second sub-band specific interleaver for the second sub-band.

16. The non-transitory computer readable medium according to claim 12, wherein the first operations include:
multiplying the first set of modulation symbols using a first sub-band specific complex or real value for the first sub-band, and multiplying the second set of modulation symbols using a second sub-band specific complex or real value for the second sub-band.

17. The non-transitory computer readable medium according to claim 12, wherein the first operations include:
providing a first set of precoded modulation symbols and a second set of precoded modulation symbols by Discrete Fourier Transform (DFT) the first set of modulation symbols and the second set of modulation symbols, providing the first set of mapped modulation symbols by mapping the first set of precoded modulation symbols onto the set of frequency resources within the first sub-band, and providing the second set of mapped modulation symbols by mapping the second set of precoded modulation symbols onto the corresponding set of frequency resources within the second sub-band.

18. The non-transitory computer readable medium according to claim 17, wherein the first operations include:
precoding the first set of modulation symbols using a first sub-band specific DFT precoder for the first sub-band and precoding the second set of modulation symbols using a second sub-band specific DFT precoder for the second sub-band.

* * * * *